(12) United States Patent
Briden

(10) Patent No.: US 12,459,205 B2
(45) Date of Patent: Nov. 4, 2025

(54) TRANSFER SCREENS TO BE 3D FABRICATED WITH DETERMINED PORE PLACEMENTS

(71) Applicant: Peridot Print LLC, Palo Alto, CA (US)

(72) Inventor: John J. Briden, Palo Alto, CA (US)

(73) Assignee: Peridot Print LLC, Palo Alo, CA (US)

( * ) Notice: Subject to any disclaimer, the term of this patent is extended or adjusted under 35 U.S.C. 154(b) by 273 days.

(21) Appl. No.: 18/023,364

(22) PCT Filed: Sep. 22, 2020

(86) PCT No.: PCT/US2020/052050
§ 371 (c)(1),
(2) Date: Feb. 26, 2023

(87) PCT Pub. No.: WO2022/066149
PCT Pub. Date: Mar. 31, 2022

(65) Prior Publication Data
US 2023/0302736 A1    Sep. 28, 2023

(51) Int. Cl.
*B29C 64/386*    (2017.01)
*D21J 3/00*    (2006.01)
*D21J 7/00*    (2006.01)
*B33Y 50/00*    (2015.01)
*B33Y 80/00*    (2015.01)

(52) U.S. Cl.
CPC .............. *B29C 64/386* (2017.08); *D21J 3/00* (2013.01); *D21J 7/00* (2013.01); *B33Y 50/00* (2014.12); *B33Y 80/00* (2014.12)

(58) Field of Classification Search
CPC .................................................... B29C 64/386
USPC ........................................................ 162/218
See application file for complete search history.

(56) References Cited

U.S. PATENT DOCUMENTS

| | | |
|---|---|---|
| 6,582,562 B2 | 6/2003 | Gale et al. |
| 7,997,891 B2 | 8/2011 | Gallagher et al. |
| 9,765,484 B2 | 9/2017 | Wang et al. |
| 2005/0150624 A1 | 7/2005 | Toh et al. |
| 2011/0168346 A1 | 7/2011 | Nilsson et al. |

(Continued)

FOREIGN PATENT DOCUMENTS

| | | |
|---|---|---|
| DE | 102018003447 A1 | 10/2019 |
| EP | 0732181 A1 | 9/1996 |

(Continued)

*Primary Examiner* — Jacob T Minskey
(74) *Attorney, Agent, or Firm* — Michael Dryja

(57) ABSTRACT

According to examples, a non-transitory computer-readable medium may have stored thereon instructions that may cause a processor to obtain a digital model of a transfer screen to be 3D fabricated. The processor may also determine placements of pores in the digital model, in which the transfer screen is to be mounted on a transfer mold via an attachment mechanism and to engage a surface of a wet part formed on a corresponding forming screen. The forming screen may have a first shape and the transfer screen may have a second shape that is complementary to the first shape, and the locations of the pores may be determined to allow liquid to be suctioned from the wet part when a vacuum pressure is applied to the transfer mold. The processor may further modify the digital model of the transfer screen to include the pores at the determined placements.

7 Claims, 5 Drawing Sheets

(56) References Cited

U.S. PATENT DOCUMENTS

| | | |
|---|---|---|
| 2016/0145811 A1 | 5/2016 | Socci et al. |
| 2018/0086511 A1* | 3/2018 | Lin |
| 2018/0093418 A1* | 4/2018 | Lappas .................. B33Y 50/02 |
| 2020/0063295 A1* | 2/2020 | Mitchell ................ D21H 13/24 |

FOREIGN PATENT DOCUMENTS

| | | |
|---|---|---|
| EP | 0857822 A1 | 8/1998 |
| GB | 2456502 A | 7/2009 |
| WO | 98/35097 A1 | 8/1998 |
| WO | 2016/055072 A1 | 4/2016 |
| WO | 2016/101976 A1 | 6/2016 |
| WO | 2020/141209 A1 | 7/2020 |

* cited by examiner

```
                                    400
    ┌─────────────────────────────────────────────────┐
    │  CAUSE A 3D FABRICATED FORMING SCREEN TO BE     │
    │             IMMERSED IN A SLURRY                │
    │                     402                         │
    └─────────────────────────────────────────────────┘
                          │
                          ▼
    ┌─────────────────────────────────────────────────┐
    │       CAUSE A VACUUM PRESSURE TO BE APPLIED     │
    │                     404                         │
    └─────────────────────────────────────────────────┘
                          │
                          ▼
    ┌─────────────────────────────────────────────────┐
    │  CAUSE THE 3D FABRICATED FORMING SCREEN AND     │
    │   WET PART TO BE MOVED OUT OF THE SLURRY        │
    │                     406                         │
    └─────────────────────────────────────────────────┘
                          │
                          ▼
    ┌─────────────────────────────────────────────────┐
    │   CAUSE A 3D FABRICATED TRANSFER SCREEN TO BE   │
    │   MOVED INTO ENGAGEMENT WITH THE WET PART       │
    │                     408                         │
    └─────────────────────────────────────────────────┘
                          │
                          ▼
    ┌─────────────────────────────────────────────────┐
    │   CAUSE THE 3D FABRICATED TRANSFER SCREEN TO    │
    │                BE MOVED AWAY                    │
    │                     410                         │
    └─────────────────────────────────────────────────┘
                          │
                          ▼
    ┌─────────────────────────────────────────────────┐
    │  CAUSE A VACUUM PRESSURE TO BE APPLIED TO       │
    │     REMOVE LIQUID FROM THE WET PART             │
    │                     412                         │
    └─────────────────────────────────────────────────┘
```

*FIG. 4*

TRANSFER SCREENS TO BE 3D FABRICATED WITH DETERMINED PORE PLACEMENTS

BACKGROUND

Various types of products may be fabricated from a pulp of material. Particularly, a pulp molding die that includes a main body and a mesh may be immersed in the pulp of material and the material in the pulp may form into the shape of the main body and the mesh. The main body and the mesh may have a desired shape of the product to be formed. The complexity of the shape of the product to be formed depends largely on the accuracy with which the mesh may be crafted. The main body and the mesh may include numerous pores for liquid passage, in which the pores in the mesh may be significantly smaller than the pores in the main body. During formation of the product, a vacuum force may be applied through the pulp molding die which may cause the material in the pulp to be sucked onto the mesh and form into a shape that matches the shape of the pulp molding die. The material may be removed from the mesh and may be solidified, for example through drying, to have the desired shape.

BRIEF DESCRIPTION OF THE DRAWINGS

Features of the present disclosure are illustrated by way of example and not limited in the following figure(s), in which like numerals indicate like elements, in which:

FIG. 4 shows a flow diagram of an example method for forming a wet part on an example 3D fabricated forming screen and transferring the formed wet part to an example 3D fabricated transfer screen.

DETAILED DESCRIPTION

Figure 1:
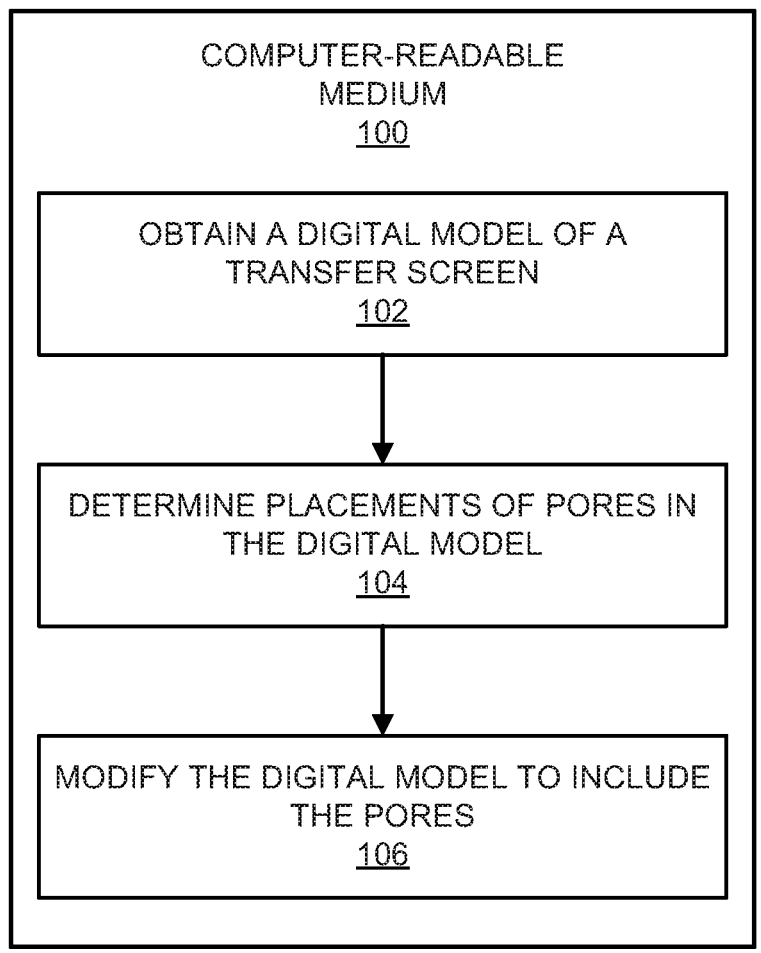
FIG. 1 shows a block diagram of an example computer-readable medium that may have stored thereon computer-readable instructions for modifying a digital model of a transfer screen to include a plurality of pores at determined locations.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are computer-readable media that may include instructions that may cause a processor to determine placements of a plurality of pores in the digital model of a transfer screen, in which the transfer screen is to be mounted on a transfer mold via an attachment mechanism. The transfer screen may also be to engage a surface of a wet part formed on a corresponding forming screen, in which the forming screen has a first shape and the transfer screen has a second shape that is complementary to the first shape, and wherein the locations of the plurality of pores may be determined to allow liquid to be suctioned from the wet part when a vacuum pressure is applied to the transfer mold. The processor may also modify the digital model of the transfer screen to include the plurality of pores at the determined placements.

Also disclosed herein are pulp molding tool sets that may include a forming mold and a forming screen that is to be mounted on the forming mold. A liquid from a slurry may be suctioned through pores in the forming screen and pores of the forming mold when a vacuum pressure is applied to the forming mold during formation of a wet part on the forming screen. The pulp molding tool set may also include a transfer mold having a plurality of pores and a transfer screen to be mounted on the transfer mold. The transfer screen may include a plurality of pores, in which at least some of the liquid in the wet part is to be suctioned from the wet part through the pores in the transfer screen and the pores in the transfer mold when a vacuum pressure is applied to the transfer mold to de-water the wet part. In addition, in some examples, at least the forming screen and the transfer screen may be fabricated by a three-dimensional (3D) fabrication system while in other examples, the forming mold and the transfer mold may also be fabricated by the 3D fabrication system.

Further disclosed herein are methods for forming a wet part on a 3D fabricated forming screen and transferring the formed wet part to a 3D fabricated transfer screen. Particularly, for instance, a processor may cause a 3D fabricated forming screen to be immersed into a slurry containing a liquid and material elements and while the 3D fabricated forming screen is immersed in the slurry, cause a vacuum pressure to be applied through the 3D fabricated forming screen to cause some of the material elements to agglomerate into a wet part on the 3D fabricated forming screen. The processor may also cause the 3D fabricated forming screen and the wet part to be moved out of the slurry and cause a 3D fabricated transfer screen to be moved into engagement with the wet part, in which the 3D fabricated forming screen has a first shape and the 3D fabricated transfer screen has a second shape that is complementary to the first shape. The processor may further cause the 3D fabricated transfer screen to be moved away from the 3D fabricated forming screen while vacuum pressure is applied through a plurality of pores in the 3D fabricated transfer screen to cause the wet part to be removed from the 3D fabricated forming screen and become engaged with the 3D fabricated transfer screen. In addition, the processor may cause the vacuum pressure to be continued to be applied through the 3D fabricated transfer screen to remove additional liquid from the wet part.

Still further disclosed herein are transfer screens that may include a body and a plurality of pores extending through the body, in which the body and the plurality of pores are to be fabricated by a 3D fabrication system. In addition, the body is to be mounted on a transfer mold to cause the plurality of pores to be in liquid communication with pores in the transfer mold. A liquid is to be suctioned from a wet part through the plurality of pores when a vacuum pressure is applied to the transfer mold and the body is in contact with the wet part to de-water the wet part following formation of the wet part on a forming screen from a slurry containing a liquid and material elements.

Through implementation of the features of the present disclosure, a transfer screen may be designed and fabricated to be complementary in shape to a forming screen on which a wet part may be formed. The pores in the transfer screen may be deterministically placed to, for instance, cause suction pressure to be substantially evenly be distributed across a contacting surface of the wet part when a vacuum pressure is applied through the transfer screen. In one regard, the substantially even distribution of the suction pressure across the contacting surface of the wet part may enable for greater levels of suction pressure to be applied to the wet part without damaging or reducing damage caused to the wet part. For instance, a sufficient level of suction pressure may be applied onto the wet part to cause some of the liquid to be removed from the wet part.

By removing some of the liquid from the wet part, e.g., de-watering the wet part, when the wet part undergoes drying, the amount of energy and/or the amount of time to dry the wet part may significantly be reduced. In addition, the application of vacuum pressure through the pores of the transfer screen may cause the material elements at the surface of the wet part that is in contact with the transfer screen to have a greater density than the material elements closer to the center of the wet part. As a result, the wet part may resist warpage during drying of the wet part, for instance, in an oven, due to a greater level of symmetrical shrinkage afforded by the denser surface that may match the similarly denser surface caused during forming on the opposite (form) side of the wet part. Additionally, the surface may be relatively smoother than when the wet part is allowed to de-water without the application of pressure onto the surface of the wet part. Moreover, by de-watering the wet part while the wet part is in engaged with the transfer screen instead of waiting for the wet part to be de-watered while engaged with the forming screen, the forming screen may more quickly be used to form a next wet part, which may increase the speeds and throughput at which wet parts may be fabricated.

Through application of the more evenly distributed pressure onto the surface of the wet part via the transfer screen, wet parts having substantially vertical walls may be formed as the suction pressure is applied across the entire or substantial portion of the surface and therefore may enable sufficient force to be applied to remove such a wet part from such a forming mold. Additionally, the increased and/or more evenly distributed pressure may enable details to be imprinted onto the surfaces of the wet parts that are in contact with the transfer screen. That is, the transfer screen may include raised or lowered features on the transfer screen corresponding to the details, such as, embossed logos, embossed textures, embossed text, and/or the like, and the features may be imprinted into the surfaces of the wet parts as the pressure is applied across the surfaces. In some examples, the transfer screen may be removably mountable to a transfer mold such that the transfer screen may readily be mounted onto and removed from the transfer mold. In these examples, multiple transfer screens with different features may easily be swapped out in order to form different details onto the wet parts.

Figure 2:
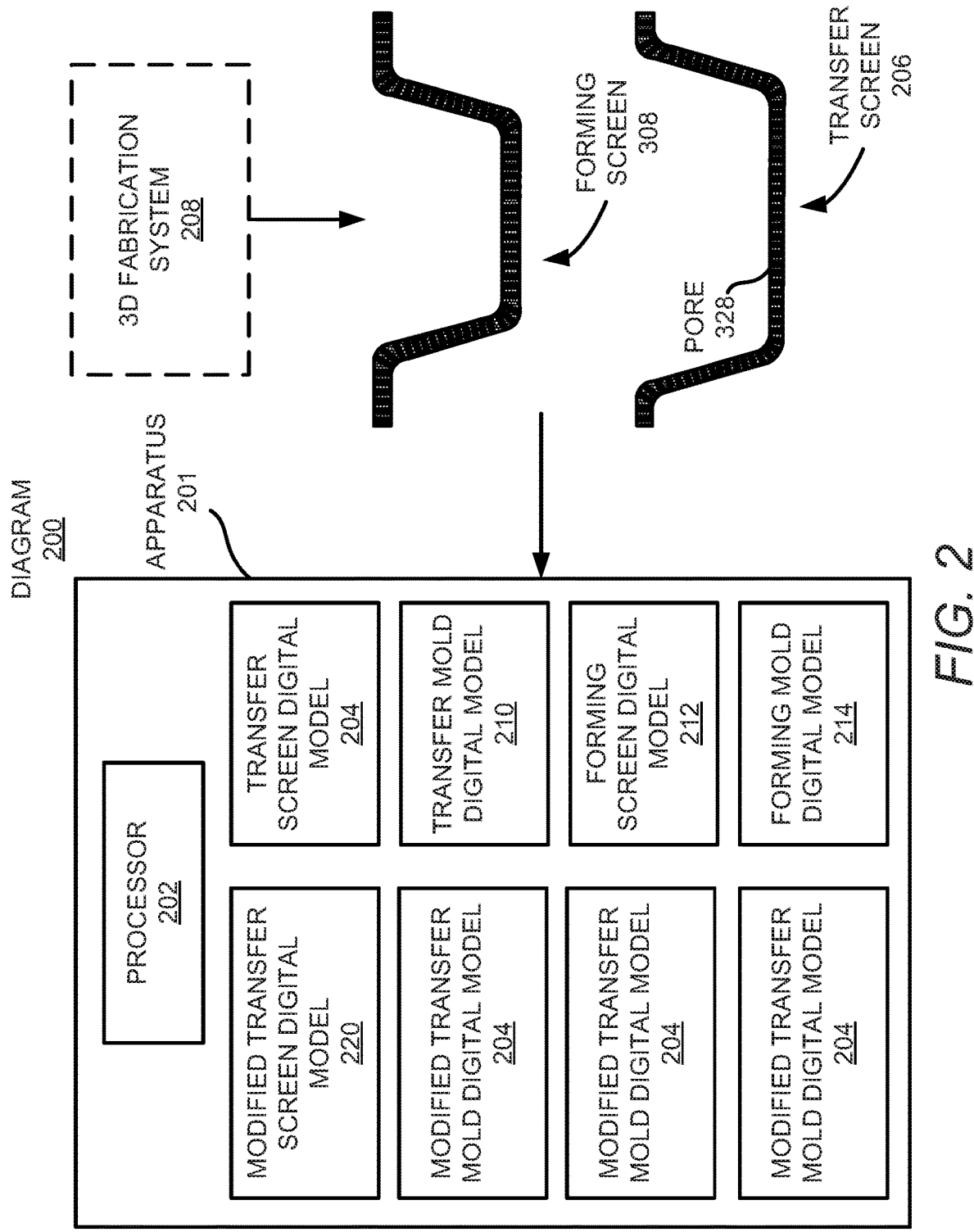
FIG. 2 shows a diagram, which includes an example processor that may execute the computer-readable instructions stored on the example computer-readable medium shown in FIG. 1 on the digital model of the transfer screen to generate a modified digital model.
Figure 3A:
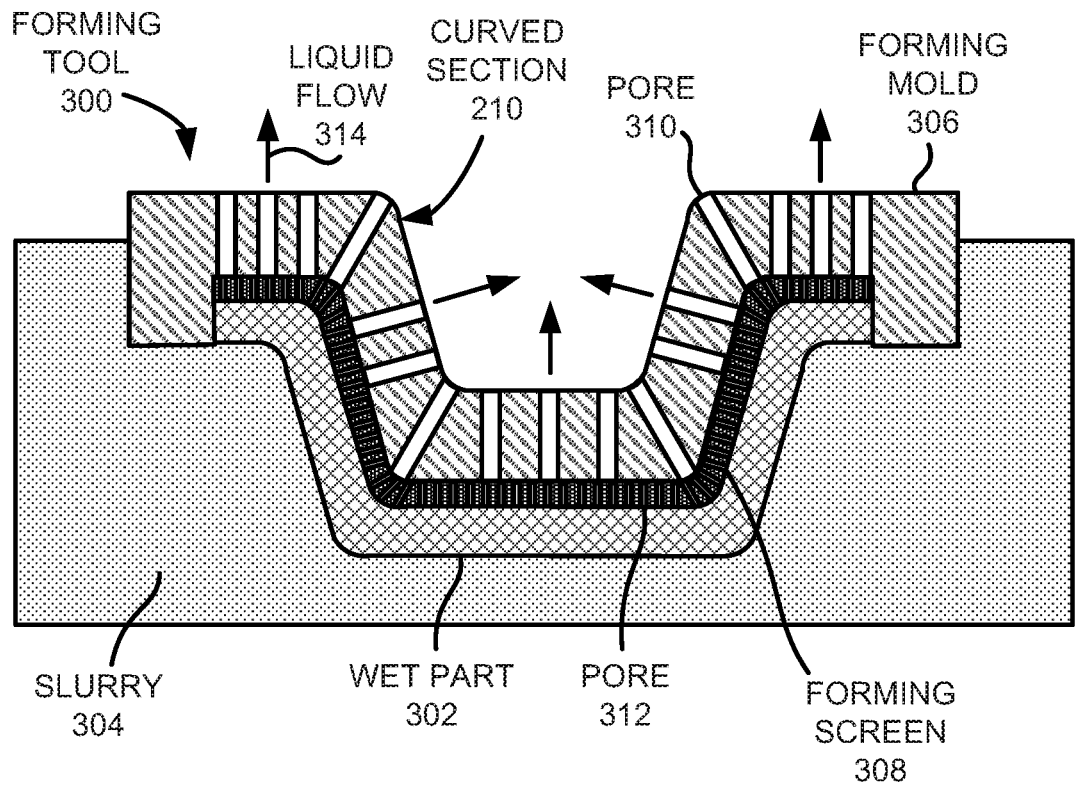
FIGS. 3A and 3B, respectively, depict, cross-sectional side views of an example forming tool and an example transfer tool.
Figure 3B:
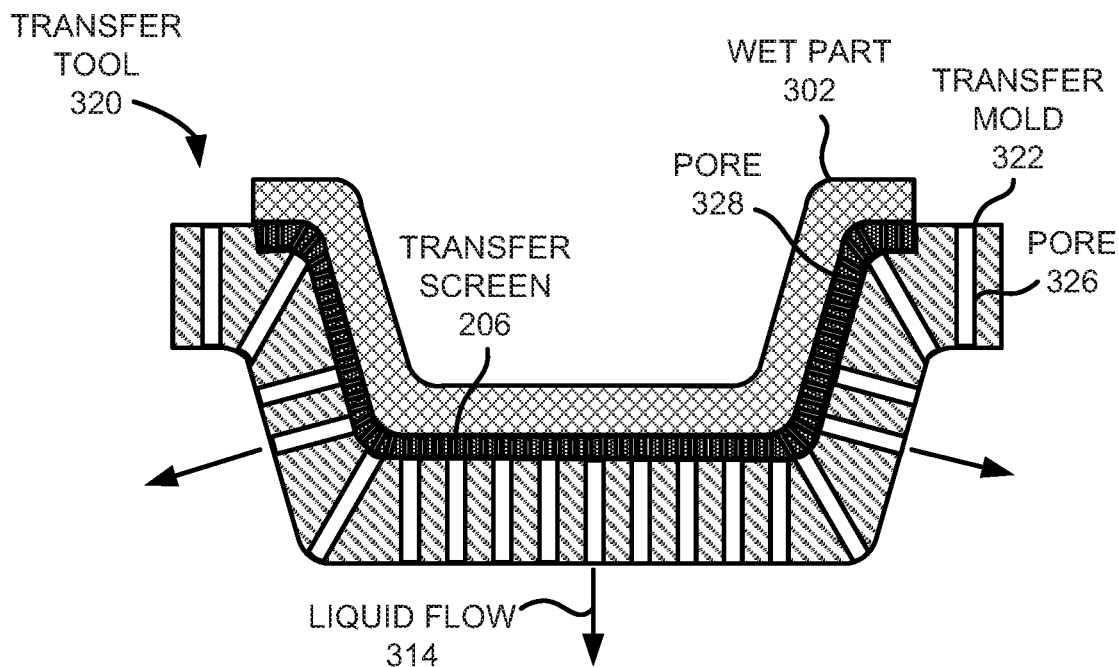
Figure 3C:
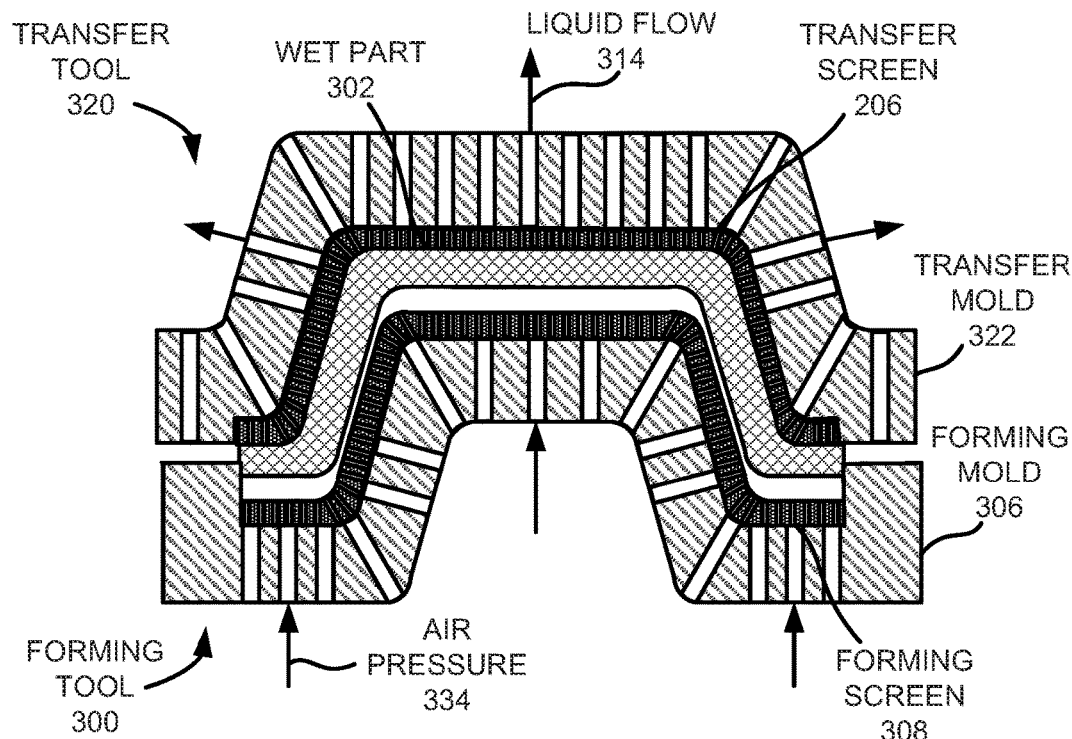
FIG. 3C shows a cross-sectional side view of the example forming tool and the example transfer tool depicted in FIGS. 3A and 3B during a removal by the example transfer tool of the wet part from the example forming tool.

Reference is first made to FIGS. 1, 2, and 3A-3O. FIG. 1 shows a block diagram of an example computer-readable medium 100 that may have stored thereon computer-readable instructions for modifying a digital model 204 of a transfer screen 206 to include a plurality of pores at determined locations. FIG. 2 shows a diagram 200, which includes an example processor 202 that may execute the computer-readable instructions stored on the example computer-readable medium 100 on the digital model 204 of the transfer screen 206 to generate a modified digital model 220. FIGS. 3A and 3B, respectively, depict, cross-sectional side views of an example forming tool 300 and an example transfer tool 320 and FIG. 3C shows a cross-sectional side view of the example forming tool 300 and the example transfer tool 320 during a removal by the example transfer tool 320 of the wet part 302 from the example forming tool 300. It should be understood that the example computer-readable medium 100 depicted in FIG. 1, the example processor 202 depicted in FIG. 2, and/or the example forming tool 300 and the example transfer tool 320 respectively depicted in FIGS. 3A-3O may include additional attributes and that some of the attributes described herein may be removed and/or modified without departing from the scopes of the example computer-readable medium 100, the example processor 202, and/or the example forming tool 300 and the example transfer tool 320.

The computer-readable medium 100 may have stored thereon computer-readable instructions 102-106 that a processor, such as the processor 202 depicted in FIG. 2, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 202 may fetch, decode, and execute the instructions 102 to obtain a digital model 204 of a transfer screen 206 to be fabricated by a three-dimensional (3D) fabrication system 208. The processor 202 may also obtain respective digital models 210-214 of a transfer mold 322, a forming screen 308, and/or a forming mold 306. Each of the digital models 204, 210-214 may be a 3D computer model of a respective one of the transfer screen 206, the transfer mold 322, the forming screen 308, and/or the forming mold 306, such as a computer aided design (CAD) file, or other digital representation of these components. In addition, the processor 202 may obtain (or equivalently, access, receive, or the like) the digital models 204, 210-214 from a data store (not shown) or some other suitable source. In some examples, the digital models 204, 210-214 may be generated using a CAD program or another suitable design program.

According to examples, and as discussed in greater detail herein, the forming tool 300 and the transfer tool 320 may be employed in the fabrication of a wet part 302 from a slurry 304 of a liquid and material elements. In some examples, the liquid may be water or another type of suitable liquid in which pulp material, e.g., paper, wood, fiber crops, bamboo, or the like, may be mixed into the slurry 304. The material elements may be, for instance, fibers of the pulp material.

The processor 202 may fetch, decode, and execute the instructions 104 to determine placements of a plurality of pores 328 in the digital model 204 of the transfer screen 206, in which the plurality of pores 328 are to be formed in a body of the transfer screen 206. As shown in FIG. 3B, the transfer screen 206 may be mounted on a transfer mold 322, which may include a plurality of pores 326, via an attachment mechanism (not shown). The attachment mechanism may be any suitable type mechanical structure that may enable the transfer screen 206 to removably be mounted to the transfer mold 322. The transfer screen 206 may also engage a surface of a wet part 302 formed on a corresponding forming screen 308 during transfer of the wet part 302 from the forming screen 308. As shown in FIG. 3C, the forming screen 308 may have a first shape and the transfer screen 206 may have a second shape that is complementary to the first shape. As a result, multiple sides of the transfer screen 206 may contact multiple sides of the wet part 302 formed on the forming screen 308.

According to examples, the pores 328 in the transfer screen 206 may have properties, e.g., sizes and/or shapes, such that pressure may be applied onto the wet part 302 as described herein when a vacuum pressure is applied through the pores 328. For instance, the pores 328 may be positioned and may have certain properties to cause pressure to be evenly applied across multiple surfaces of the wet part 302. As other examples, the pores 328 may be positioned and may have certain properties to enable sufficient pressure to be applied across the multiple surfaces of the wet part 302 to suction liquid from the wet part 302 without, for instance, damaging the wet part 302. In one regard, through application of substantially even pressure across multiple surfaces of the wet part 302, the transfer screen 206 may be employed to remove a wet part 302 having a substantially vertical surface. In this regard, at least one of the multiple surfaces of the transfer screen 206 may extend substantially vertically (e.g., have a substantially zero draft) when removing the wet part 302 from the forming screen 308.

The processor 202 may determine the locations at which the pores 328 are to be positioned in the transfer screen 206 to allow liquid to be suctioned from the wet part 302 when the transfer screen 206 is mounted to the transfer mold 322 and a vacuum pressure is applied to the transfer mold 322. The processor 202 may determine the pore 328 locations that may cause, for instance, the even application across a surface of the transfer screen 206 through testing of previously fabricated transfer screens 206 and transfer molds 322, through modeling of transfer screens 206 having various properties, and/or the like. In addition, the processor 202 may employ packing operations to determine the locations at which the pores 328 are to be placed in the transfer screen 206. By way of example, the processor 202 may implement a packing algorithm that may cause a maximum number of pores 328 to be added to the transfer screen 206 while causing the transfer screen 206 to have a certain level of mechanical strength, e.g., to prevent weak points. In this example, the algorithm may be a sphere or ellipsoid packing algorithm or other suitable algorithm for determining placements of the pores 328.

According to examples, the processor 202 may determine the locations of the pores 328 based on the properties (e.g., shapes and/or sizes) and/or locations of pores 326 in the forming mold 322. In these examples, the processor 202 may obtain a digital model 210 of the transfer mold 322, in which the transfer mold digital model 322 may include a plurality of pores 326 or a plurality of pores 326 are to be added algorithmically to the transfer mold digital model 210. In addition, the processor 202 may determine the placements of the plurality of pores 328 in the transfer screen 206 with respect to liquid flow characteristics predicted to occur through the plurality of pores 326 in the transfer mold 322. That is, based on how liquid is predicted or modeled to flow through the pores 326 in the transfer mold 322, the pores 328 may be deterministically placed to cause the flow through the pores 328 to be substantially even across the transfer screen 206. This may include, for instance, placing some pores 328 at higher density levels at some locations of the transfer screen 206 while some locations of the transfer screen 206 may include no pores 328.

Figure 3D:
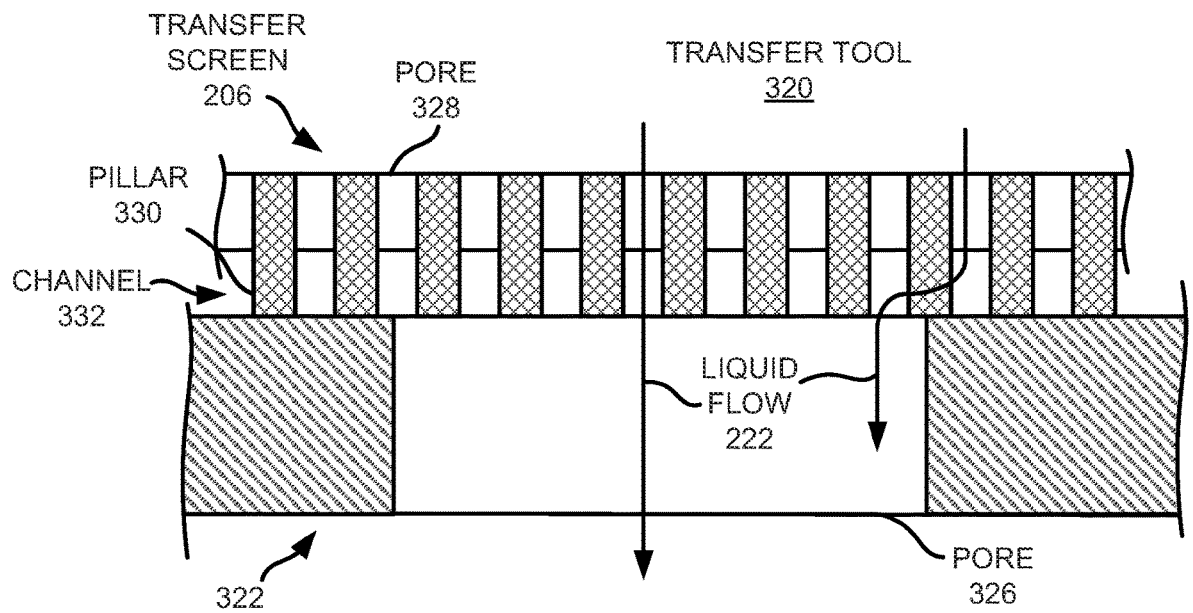
FIG. 3D shows an enlarged cross-sectional view of a section of the example transfer tool shown in FIG. 3B.

In addition, and as shown in FIG. 3D, a plurality of structural features, such as pillars 330, may be provided between the surfaces of the transfer mold 322 and the transfer screen 206 that are respectively adjacent and face each other to enable liquid to flow laterally between the transfer mold 322 and the transfer screen 206. As some of the pores 328 in the transfer screen 206 do not directly align with the pores 326 in the transfer mold 322, the channels 332 formed by the structural features 330 may enable liquid to flow through those pores 328 in addition to the pores 328 that are directly aligned with respective pores 326 in the transfer mold 322. The channels 332 may thus enable pressure to be applied through a larger number of the pores 328 and thus cause liquid to flow through the larger number of the pores 328 while enabling the space between the transfer screen 206 and the transfer mold 322 to be relatively small, e.g., minimized. The structural features 330 may be formed on the transfer screen 206 and/or the transfer mold 322.

In examples in which the structural features 330 are provided between the transfer screen 206 and the transfer mold 322 to form the channels 332, the processor 202 may determine the locations of the pores 328 also based on the predicted flow of liquid in the channels 332.

The processor 202 may fetch, decode, and execute the instructions 106 to modify the digital model 204 of the transfer screen 206 to include the pores 328 at the determined placements to generate a modified transfer screen digital model 220. The processor 202 may also send the modified transfer screen digital model 220 to the 3D fabrication system 208, in which the 3D fabrication system 208 is to fabricate the transfer screen 206 with the plurality of pores 328 at the determined placements. Particularly, the processor 202 may send the modified transfer screen digital model 220 to a controller or processor of the 3D fabrication system 208, which may process or otherwise use the modified transfer screen digital model 220 to fabricate the transfer screen 206. In other examples, the processor 202 may be the controller or processor of the 3D fabrication system 208.

In some examples, the processor 202 may be part of an apparatus 201, which may be a computing system such as a server, a laptop computer, a tablet computer, a desktop computer, or the like. The processor 202 may be a semiconductor-based microprocessor, a central processing unit (CPU), an application specific integrated circuit (ASIC), a field-programmable gate array (FPGA), and/or other suitable hardware device. The apparatus 201 may also include a memory that may have stored thereon computer-readable instructions (which may also be termed computer-readable instructions) that the processor 202 may execute. The memory may be an electronic, magnetic, optical, or other physical storage device that contains or stores executable instructions. The memory may be, for example, Random Access memory (RAM), an Electrically Erasable Programmable Read-Only Memory (EEPROM), a storage device, an optical disc, and the like. The memory, which may also be referred to as a computer-readable storage medium, may be a non-transitory computer-readable storage medium, where the term "non-transitory" does not encompass transitory propagating signals.

The 3D fabrication system 208 may be any suitable type of additive manufacturing system. Examples of suitable additive manufacturing systems may include systems that may employ curable binder jetting onto build materials (e.g., thermally or UV curable binders), ink jetting onto build materials, selective laser sintering, stereolithography, fused deposition modeling, etc. In a particular example, the 3D fabrication system 208 may form the transfer screen 206 by binding and/or fusing build material particles together. In any of these examples, the build material particles may be any suitable type of material that may be employed in 3D fabrication processes, such as, a metal, a plastic, a nylon, a ceramic, an alloy, and/or the like. Generally speaking, higher functionality/performance transfer screens 206 may be those with the smallest pore size to block fibers of smaller sizes, and hence some 3D fabrication system technologies may be more suited for generating the transfer screens 206 than others.

According to examples, the processor 202 may modify the transfer screen digital model 204 to add features to the transfer screen digital model 204 to impart a detail into the wet part 302 during suctioning of the liquid from the wet part 302. The features may be sections (e.g., protrusions) that may be raised above a nominal surface of the transfer screen digital model 204, sections (e.g., indentations) that may be below the nominal surface of the transfer screen digital model 204, and/or a combination thereof. In addition, the pores 328 may extend through some or all of those sections. The detail may include a 3D logo, 3D text, a predefined 3D texture, a predefined 3D pattern, a combination thereof, and/or the like. In these examples, the processor 202 may send the modified transfer screen digital model 220 including the features to impart the detail into the wet part 302 to the 3D fabrication system 208.

According to examples, the processor 202 may also obtain a digital model 212 of a forming screen 308 to be fabricated by the 3D fabrication system 208. The forming screen digital model 212 may include a plurality of pores 312 or a plurality of pores 312 are to be added algorithmically to the forming screen digital model 212. In these examples, the forming screen 308 may be mounted on a forming mold 306 via an attachment device (not shown). The attachment device may be any suitable type of mechanical structure that may enable the forming screen 308 to removably be mounted to the transfer mold 322. In addition, the wet part 302 may be formed on the forming screen 308 from a slurry 304 through application of a vacuum pressure through the forming mold 306 as discussed in greater detail herein. Moreover, the transfer screen 206 is to engage the wet part 302 during removal of the wet part 302 from the forming screen 308 as also discussed in greater detail herein.

Reference is now made to FIGS. 3A-3O. FIG. 3A shows a cross-sectional side view of a forming tool 300, in which a portion of the forming tool 300 has been depicted as being placed within a volume of the slurry 304. FIG. 3B shows a cross-sectional side view of the transfer tool 320 that may remove the wet part 302 from the forming screen 308. FIG. 3O shows a cross-sectional side view of the forming tool 300 and the transfer tool 320 during a removal by the transfer tool 320 of the wet part 302 from the forming tool 300. The forming tool 300 and the transfer tool 320 may collectively form a pulp molding tool set.

As shown in FIG. 3A, the forming tool 300 may include a forming mold 306 and a forming screen 308, in which the forming screen 308 may overlay the forming mold 306. As shown in FIG. 3B, the transfer tool 320 may include a transfer mold 322 and a transfer screen 206. In some examples, the forming screen 308 and the transfer screen 206 may be fabricated by a 3D fabrication system 208. The forming mold 306 and the transfer screen 322 may also be fabricated by the 3D fabrication system 208.

In some examples, the forming mold 306 and/or the transfer mold 322 may be removably mounted onto respective supporting structures (not shown) such that, for instance, the forming mold 306 may be moved independently from the transfer mold 322. Moreover, the forming mold 306 and the forming screen 308 may be fabricated to have shapes to which the wet part 302 may be molded when formed on the forming screen 308. Likewise, the transfer mold 322 and the transfer screen 206 may be fabricated to have shapes that may engage multiple surfaces of the wet part 302 formed on the forming screen 308. The transfer screen 206 may have a shape that is complementary to the shape of the forming screen 308.

As shown, the forming mold 306 may be formed to have a relatively larger thickness than the forming screen 308 and the transfer mold 322 may be formed to have a relatively larger thickness than the transfer screen 206. In some examples, the transfer screen 206 and the forming screen 308 may have the same or similar thicknesses and/or the transfer mold 322 and the forming mold 306 may have the same or similar thicknesses. The larger thicknesses of the forming mold 306 and the transfer mold 322 may cause the forming mold 306 and the transfer mold 322 to be substantially more rigid than the forming screen 308 and the transfer screen 206. The forming mold 306 may provide structural support for the forming screen 308 and the transfer mold 322 may provide structural support for the transfer screen 206.

In some examples, different versions of the forming screen 308 may be mounted to the forming mold 306 to form wet parts 302 having different details. For instance, a first forming screen 308 may include a first feature that may be imprinted onto the wet part 302 as a first detail and a second forming screen 308 may include a second feature that may be imprinted onto the wet part 302 as a second detail, in which the first feature and the second feature may be logos, intended textures, text, designs, and/or the like. In this regard, different details may be added to the wet part 302 through the use of different forming screens 308, while using the same forming mold 306, which may simplify the formation of wet parts 302 having various details.

Likewise, different versions of the transfer screen 206 may be mounted to the transfer mold 322 to imprint different details onto a surface (or multiple surfaces) of the wet parts 302. For instance, a first transfer screen 206 may include a first feature that may be imprinted onto the wet part 302 as a first detail and a second forming screen 308 may include a second feature that may be imprinted onto the wet part 302 as a second detail. The first detail and the second detail may also include logos, intended textures, predefined patterns, text, designs, and/or the like. In this regard, different details may be added to the wet part 302 through the use of different transfer screens 206, while using the same transfer mold 322, which may also simplify the formation of wet parts 302 having various details. In some examples, the features on the transfer screen 206 may be complementary versions of features on the forming screen 308 such that, for instance, a common detail may be formed on both opposite surfaces on the wet part 302.

The forming mold 306 and/or the forming screen 308 may include an attachment mechanism (or attachment device) for the forming screen 308 to be mounted to the forming mold 306. Likewise, the transfer mold 322 and/or the transfer screen 206 may include an attachment mechanism (or attachment device) for the transfer screen 206 to be mounted to the transfer mold 322. In either case, the mechanism may include mechanical fasteners, detents, and/or the like to enable the forming screen 308 to be removably mounted onto the forming mold 306 and/or the transfer screen 206 to be removably mounted onto the transfer mold 322. The mechanism that mounts the forming screen 308 to the forming mold 306 and/or that mounts the transfer screen 206 to the transfer mold 322 may be a quick release mechanism to enable the forming screen 308 and/or the transfer screen 206 to easily be released from the respective forming mold 306 and transfer mold 322. This may facilitate replacement of the forming screen 308 and/or the transfer screen 206 for maintenance purposes and/or for screens 308, 206 having different features to be employed in the formation of wet parts 302.

As also shown in FIGS. 3A-3O, each of the forming mold 306, the forming screen 308, the transfer mold 322, and the transfer screen 206 may include respective pores 310, 312, 326, 328 that may extend completely through respective top and bottom surfaces of the forming mold 306, the forming screen 308, the transfer mold 322, and the transfer screen 206. The pores 312, 328 respectively in the forming screen 308 and the transfer screen may be significantly smaller than the pores 310, 326 respectively in the forming mold 306 and the transfer mold 322. In addition, a plurality of structural features, such as pillars 330 (shown in FIG. 3D) may be provided between the surfaces of the forming mold 306 and the forming screen 308 and between the transfer mold 322 and the transfer screen 206 that are respectively adjacent and face each other to enable liquid to flow laterally between the forming mold 306 and the forming screen 308 and between the transfer mold 322 and the transfer screen 206. As some of the pores 312 in the forming screen 308 may not directly align with the pores 310 in the forming mold 306 and some of the pores 328 in the transfer screen 206 may not directly align with the pores 326 in the transfer mold 322, the channels 332 formed by the structural features may enable liquid to flow through those pores 312, 328 in addition to the pores 312, 328 that are directly aligned with respective the pores 310, 326.

Although not shown, the forming tool 300 may be in communication with a plenum to which a vacuum source may be connected such that the vacuum source may apply a vacuum pressure through the pores 310, 312 in the forming mold 306 and the forming screen 308. When the vacuum pressure is applied through the pores 310, 312, some of the liquid in the slurry 304 may be suctioned through the pores 310, 312 and may flow into the plenum as denoted by the arrows 314. As the liquid flows through the pores 310, 312, the forming screen 308 may prevent the material elements in the slurry 304 from flowing through the pores 312. That is, the pores 312 may have sufficiently small dimensions, e.g., diameters or widths, that may enable the liquid to flow through the pores 312 while blocking the material elements from flowing through the pores 312. In one regard, the diameters or widths of the pores 312 may be sized based on sizes of the material elements, e.g., fibers, in the slurry 304. By way of particular example, the pores 312 may have diameters of around 0.6 mm. The pores 328 in the transfer screen 206 may also have similar diameters. However, in some instances, the pores 328 (as well as the pores 312) may have irregular shapes as may occur during 3D fabrication processes.

Over a period of time, which may be a relatively short period of time, e.g., about a few seconds, less than about a minute, less than about five minutes, or the like, the material elements may build up on the forming screen 308. Particularly, the material elements in the slurry 304 may be accumulated and compressed onto the forming screen 308 into the wet part 302. The wet part 302 may take the shape of the forming screen 308. In addition, the thickness and density of the wet part 302 may be affected by the types and/or sizes of the material elements in the slurry 304, the length of time that the vacuum pressure is applied while the forming mold 306 and the forming screen 308 are placed within the volume of the slurry 304, etc. That is, for instance, the longer that the vacuum pressure is applied while the forming mold 306 and the forming screen 308 are partially immersed in the slurry 304, the wet part 302 may be formed to have a greater thickness.

After a predefined period of time, e.g., after the wet part 302 having desired properties has been formed on the forming screen 308, the forming mold 306 and the forming screen 308 may be removed from the volume of slurry 304. For instance, the forming mold 306 may be mounted to a movable mechanism that may move away from the volume of slurry 304. In some examples, the movable mechanism may rotate with respect to the volume such that rotation of the movable mechanism may cause the forming mold 306 and the forming screen 308 to be removed from the volume of slurry 304. In other examples, the movable mechanism may be moved laterally with respect to the volume of slurry 304. As the forming mold 306 and the forming screen 308 are removed from the volume, some of the excess slurry 304 may come off of the wet part 302. However, the wet part 302 may have a relatively high concentration of liquid.

Following the formation of the wet part 302 on the forming screen 308 and movement of the forming screen 308 and the wet part 302 out of the volume of slurry 304, the transfer tool 320 may be moved such that the transfer screen 206 may contact the wet part 302 on the forming screen 308. That is, for instance, the transfer mold 322 may be attached to a movable mechanism (not shown), in which the movable mechanism may cause the transfer mold 306 and the transfer screen 206 to move toward the forming screen 308. In some examples, the transfer tool 320 may be moved to cause the transfer screen 206 to be in contact with the wet part 302 prior to the wet part 302 being de-watered while on the forming screen 308, e.g., within a second or within a few seconds of the wet part 302 being removed from the volume of slurry 304. In one regard, the transfer tool 320 may engage the wet part 302 relatively quickly after formation of the wet part 302, which may enable the transfer tool 320 to remove the wet part 302 relatively quickly and the forming tool 300 to be inserted into the volume of slurry 304 to form a next wet part 302.

In addition, the transfer tool 320 may be in communication with a plenum to which a vacuum source may connected such that the vacuum source may apply a vacuum pressure through the pores 326, 328 while the wet part 302 is in contact with the transfer screen 206. The vacuum source may be the same or a different vacuum source to which the forming tool 300 may be in communication. The vacuum pressure applied through the forming tool 300 may be terminated or reversed (e.g., applied in the opposite direction) while the vacuum pressure is applied through the transfer tool 320.

FIG. 3O shows a state in which the transfer tool 320 may be in the process of removing the wet part 302 from the forming screen 308. Particularly, in that figure, the transfer screen 206 has been moved into contact with the wet part 302 and a vacuum pressure has been applied onto the wet part 302 through the transfer screen 206. In addition, while the vacuum pressure is applied onto the wet part 302, the transfer tool 320 may be moved away from the forming tool 300 (or the forming tool 300 may be moved away from the transfer tool 320) to pull the wet part 302 off of the forming screen 308. To further facilitate removal of the wet part 302 from the forming screen 308, air pressure may be applied through the forming tool 300 as denoted by the arrows 334. As such, the wet part 302 may be biased toward the transfer tool 320 as opposed to being biased toward the forming tool 300. While the wet part 302 is biased toward the transfer tool 320, the transfer tool 320 may be moved away from the forming tool 300 such that the transfer tool 320 may remove the wet part 302 from the forming tool 300. In FIG. 3D, the forming tool 300 and the transfer tool 320 have been rotated 180° from their respective positions in FIGS. 3A and 3B. It should, however, be understood that the transfer mold 322 may remove the wet part 302 from the forming screen 308 while the forming tool 300 and the transfer tool 320 are in other orientations.

As shown in FIG. 3B, the transfer screen 206 may include pores 328 across multiple surfaces of the transfer screen 206. In some examples, the pores 328 may be positioned deterministically in the transfer screen 206 to cause pressure to be applied substantially evenly across the transfer screen 206 when the vacuum pressure is applied. As a result, pressure may be applied substantially evenly across the surface of the wet part 302 that is in contact with the transfer screen 206. This may prevent the application of increased pressure at a particular location on the surface of the wet part 302, which may prevent the wet part 302 from being damaged by the application of the pressure onto the wet part 302 through the transfer screen 206. Additionally, this may enable the transfer tool 320 to remove wet parts 302 having a vertically or substantially vertically extending (e.g., zero draft) surface (or surfaces) from the forming screen 308 as the pressure may be sufficient to overcome frictional and other forces applied by the forming screen 308 onto the wet part 302.

When the wet part 302 is in contact with the transfer screen 206, the wet part 302 may include some of the liquid from the slurry 304. In addition, when the vacuum pressure is applied through the pores 326, 328, some of the liquid in the wet part 302 may be suctioned through the pores 326, 328 and may flow into the plenum as denoted by the arrows 314. In one regard, the application of the vacuum pressure through the pores 326, 328 may de-water the wet part 302 by removing some of the liquid from the wet part 302. As a result, when the wet part 302 undergoes drying, for instance, in an oven, the amount of energy and/or the amount of time to dry the wet part 302 may significantly be reduced.

In another regard, the application of vacuum pressure through the pores 326, 328 may cause the material elements at the surface of the wet part 302 that is contact with the transfer screen 206 to have a greater density than the material elements closer to the center of the wet part 302. As a result, the wet part 302 may resist warpage during drying of the wet part 302, for instance, in an oven, due to a greater level of symmetrical shrinkage afforded by the denser surface matching the similarly dense surface on the forming screen 308 side of the wet part 302. Additionally, the surface may be relatively smoother than when the wet part 302 is allowed to de-water without the application of pressure onto the surface of the wet part 302.

As the liquid flows through the pores 326, 328, the material elements in the wet part 302 may be prevented from flowing through the pores 328 in the transfer screen 206. That is, the pores 328 may have sufficiently small dimensions, e.g., diameters or widths, that may enable the liquid to flow through the pores 328 while blocking the material elements from flowing through the pores 328. In one regard, the diameters or widths of the pores 328 may be sized based on sizes of the material elements, e.g., fibers, in the slurry 304.

According to examples, the pores 310, 312 may respectively be positioned in the forming mold 306 and the forming screen 308 and may have properties, e.g., sizes and/or shapes, such that the wet part 302 may be formed with predefined characteristics. For instance, the pores 310, 312 may be positioned and may have certain properties to cause the wet part 302 to be formed to have an intended thickness (or thicknesses) throughout the wet part 302. By way of particular example, the pores 310, 312 may be positioned and may have certain properties to cause thicknesses of the wet part 302 to be consistent throughout the wet part 302. As another example, the pores 310, 312 may be positioned and may have certain properties to cause the wet part 302 to be formed without an area having a thickness that is below a certain threshold thickness, e.g., a thickness at which a weak point may be formed in the wet part 302. Likewise, the pores 310, 312 may be positioned and may have certain properties to cause the wet part 302 to be formed with thicker defined areas than other areas of the wet part 302.

In some examples, the positions and/or properties of the pores 310, 312, 326, and/or 328 may be determined through implementation of an algorithm that the processor 202 may execute. For instance, the algorithm may be a packing algorithm that may cause a maximum number of pores 310, 312, 326, and/or 328 to respectively be added while causing the forming mold 306, the forming screen 308, the transfer mold 322, and/or the transfer screen 206 to have certain levels of mechanical strength, e.g., to prevent weak points. In this example, the algorithm may be a sphere or ellipsoid packing algorithm or other suitable algorithm for determining placements of the pores 310, 312, 326, and/or 328.

As another example, the algorithm may be a packing algorithm that may position similarly sized pores 310 evenly across the forming mold 306 and/or similarly sized pores 312 evenly across the forming screen 308. In this example, the processor 202 may execute the algorithm to place an array of pores 310 across a flattened version of the forming mold 306 or an array of pores 312 across a flattened version of the forming screen 308. Similarly, the packing algorithm may position similarly sized pores 326 across the transfer mold 322 and/or similarly sized pores 328 across the transfer screen 206. In this example, the processor 202 may execute the algorithm to place an array of pores 326 across a flattened version of the transfer mold 322 or an array of pores 328 across a flattened version of the forming screen 308.

By placing the pores 310, 312, 326, and/or 328 across the flattened versions, the processing resources and/or time consumed to arrange the pores 310, 312, 326, and/or 328 may be reduced as compared with the processing resources and/or time consumed to implement other types of packing algorithms as the other types of packing algorithms may be more computationally intensive than the algorithm of this example. In any regard, following placement of the pores 310, 312, 326, and/or 328, the processor 202 may cause the digital models 204, 210-214 of the forming mold 306, the forming screen 308, the transfer mold 322, and/or the transfer screen 206 to include a curved section or multiple curved sections.

Turning now to FIG. 4, there is shown a flow diagram of an example method 400 for forming a wet part 302 on an example 3D fabricated forming screen 308 and transferring the formed wet part 302 to an example 3D fabricated transfer screen 206. It should be understood that the method 400 depicted in FIG. 4 may include additional operations and that some of the operations described therein may be removed and/or modified without departing from the scope of the method 400. The description of the method 400 is also made with reference to the features depicted in FIGS. 1-3D for purposes of illustration. Particularly, the processor 202 depicted in FIG. 2 may execute some or all of the operations included in the method 400 using the elements depicted in FIGS. 2-3D.

At block 402, the processor 202 may cause a three-dimensionally (3D) fabricated forming screen 308 to be immersed into a slurry 304 containing a liquid and material elements. At block 404, the processor 202 may cause a vacuum pressure to be applied through the 3D fabricated forming screen 308 to cause some of the material elements to agglomerate into a wet part 302 on the 3D fabricated forming screen 308. At block 406, the processor 202 may cause the 3D fabricated forming screen 308 and the wet part 302 to be moved out of the slurry 304. For instance, the 3D fabricated forming screen 308 may be mounted on a forming mold 306 that may itself be mounted on a movable mechanism, in which the movable mechanism may be rotatable and/or movable laterally.

At block 408, the processor 202 may cause a 3D fabricated transfer screen 206 to be moved into engagement with the wet part 302, in which the 3D fabricated forming screen 308 may have a first shape and the 3D fabricated transfer screen 206 may have a second shape that is complementary to the first shape. As shown in FIG. 3O, the 3D fabricated forming screen 308 and the 3D fabricated transfer screen 206 may have similar shapes such that multiple surfaces of the 3D fabricated transfer screen 206 may contact multiple sides of the wet part 302. According to examples, the processor 202 may cause the 3D fabricated transfer screen 206 to be moved into contact with the wet part 302 following formation of the wet part 302 on the 3D forming screen 308 such that the wet part 302 keeps substantially all the liquid from when the wet part 302 was formed on the 3D fabricated forming screen 308.

At block 410, the processor 202 may cause the 3D fabricated transfer screen 206 to be moved away from the 3D fabricated forming screen 308 while vacuum pressure is applied through a plurality of pores 328 in the 3D fabricated transfer screen 206 to cause the wet part 302 to be removed from the 3D fabricated forming screen 308 and become engaged with the 3D fabricated transfer screen 206. As shown in FIG. 3O, the transfer tool 320 may be moved away from the forming tool 300 or the forming tool 300 may be moved away from the transfer tool 320 to separate the wet part 302 from the forming screen 308.

At block 412, the processor 202 may cause the vacuum pressure to be continued to be applied through the 3D fabricated transfer screen 206 to remove additional liquid from the wet part 302. As discussed herein, application of the vacuum pressure onto the wet part 302 may result in the wet part 302 having certain characteristics and may also enable the wet part 302 to be dried relatively more quickly and with relatively less energy. After the vacuum pressure has been applied to the wet part 302 to de-water the wet part 302, the transfer tool 320 may move the wet part 302 to a conveyer belt and/or an oven such that the wet part 302 may be dried further.

According to examples, following removal of the wet part 302 from the forming screen 308, the processor 202 may cause the 3D fabricated forming screen 308 to be immersed into the slurry 304. In addition, the processor 202 may cause the vacuum pressure to be applied through the 3D fabricated forming screen 308 to form another wet part 302 on the 3D fabricated forming screen 308 from the slurry 304 while the vacuum force is continued to be applied through the plurality of pores 328 in the 3D fabricated transfer screen 206 to cause some of the additional liquid in the wet part 302 to be removed from the wet part 302. As discussed herein, the 3D fabricated transfer screen 206 may include features (such as indentions and/or protrusions) having certain shapes that are to impart a detail into the wet part 302 during removal of the additional liquid from the wet part 302. The detail may be a set of indentations and/or a set of protrusions having a predefined detail, which may include a logo, text, a predefined texture, a predefined pattern, a combination thereof, or the like.

The features may be provided on one surface or on multiple surfaces of the 3D transfer screen 206. Likewise, similar types of features may be provided on one or multiple surfaces of the 3D forming screen 308. In this regard, various details may be added to either or both sides of the wet part 302 during formation and transfer of the wet part 302. In some examples, the 3D transfer screen 206 and the 3D forming screen 308 may include features that may be mirrored versions of each other.

After the vacuum pressure has been applied to the wet part 302 to de-water the wet part 302, the transfer tool 320 may move the wet part 302 to a conveyer belt and/or an oven such that the wet part 302 may be dried further.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as computer-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium on which is stored machine-readable instructions that when executed by a processor, cause the processor to:
   obtain a digital model of a transfer screen to be fabricated by a three-dimensional (3D) fabrication system;
   determine placements of a plurality of pores in the digital model of the transfer screen, wherein the transfer screen is to be mounted on a transfer mold via an attachment mechanism and to engage a surface of a wet part formed on a corresponding forming screen, wherein the forming screen has a first shape and the transfer screen has a second shape that is complementary to the first shape, and wherein the placements of the plurality of pores are determined to allow liquid to be suctioned from the wet part when a vacuum pressure is applied to the transfer mold; and
   modify the digital model of the transfer screen to include the plurality of pores at the determined placements.

2. The non-transitory computer-readable medium of claim 1, wherein the transfer screen includes multiple surfaces, and wherein the instructions are further to cause the processor to:
   determine the placements of the plurality of pores to cause suction forces to substantially evenly be distributed across the multiple surfaces of the transfer screen when the vacuum pressure is applied to the transfer mold.

3. The non-transitory computer-readable medium of claim 2, wherein at least one of the multiple surfaces of the transfer screen extends substantially vertically.

4. The non-transitory computer-readable medium of claim 1, wherein the instructions are further to cause the processor to:
   obtain a digital model of the transfer mold, the digital model of the transfer mold including a plurality of pores or a plurality of pores are to be added algorithmically to the digital model of the transfer mold, wherein the placements of the plurality of pores are determined with respect to liquid flow characteristics predicted to occur through the plurality of pores in the transfer mold.

5. The non-transitory computer-readable medium of claim 1, wherein the instructions are further to cause the processor to:
   obtain a digital model of a forming screen to be fabricated by the 3D fabrication system, the digital model of the forming screen including a plurality of pores or a plurality of pores are to be added algorithmically to the digital model of the forming screen, wherein:
      the forming screen is to be mounted on a forming mold via an attachment device and the wet part is to be formed on the forming screen from a slurry through application of a vacuum pressure through the forming mold; and
      the transfer screen is to engage the wet part during removal of the wet part from the forming screen.

6. The non-transitory computer-readable medium of claim 1, wherein the instructions are further to cause the processor to:
   modify the digital model of the transfer screen to add features to the digital model to impart a detail into the wet part during suctioning of the liquid from the wet part, wherein the detail comprises a logo, text, a predefined texture, a predefined pattern, or a combination thereof.

7. The non-transitory computer-readable medium of claim 1, wherein the instructions are further to cause the processor to:
   send the modified digital model of the transfer screen to the 3D fabrication system, wherein the 3D fabrication system is to fabricate the transfer screen with the plurality of pores at the determined placements.

* * * * *